United States Patent [19]

Iijima

[11] Patent Number: 5,365,045
[45] Date of Patent: Nov. 15, 1994

[54] PORTABLE ELECTRIC DEVICE

[75] Inventor: Yasuo Iijima, Yokohama, Japan

[73] Assignee: Kabushiki Kaisha Toshiba, Kawasaki, Japan

[21] Appl. No.: 710,025

[22] Filed: Jun. 6, 1991

[30] Foreign Application Priority Data

Jun. 7, 1990 [JP] Japan .................. 2-147480

[51] Int. Cl.⁵ .............................. G06K 5/00
[52] U.S. Cl. .................. 235/380; 235/437; 235/492
[58] Field of Search ............ 235/380, 437, 492; 371/60

[56] References Cited

U.S. PATENT DOCUMENTS 4,845,717 7/1989 Iijima .................. 235/437

FOREIGN PATENT DOCUMENTS 60-3082 1/1985 Japan .
60-207989 10/1985 Japan .

Primary Examiner—Harold Pitts
Attorney, Agent, or Firm—Cushman, Darby & Cushman

[57] ABSTRACT

An IC card comprises, a memory including a system area for storing system information, and a user area for storing user information, a CPU for controlling information read/write access of the memory, and a memory for storing program data for determining an operation of the CPU. The CPU stores predetermined data in the user area on the basis of a first command obtained from an external device, and compares the predetermined data with another predetermined data stored in the user area on the basis of a second command obtained from the external device. The CPU detects an abnormality of one of the memory, and data and address lines of the memory according to the result of comparison.

10 Claims, 18 Drawing Sheets

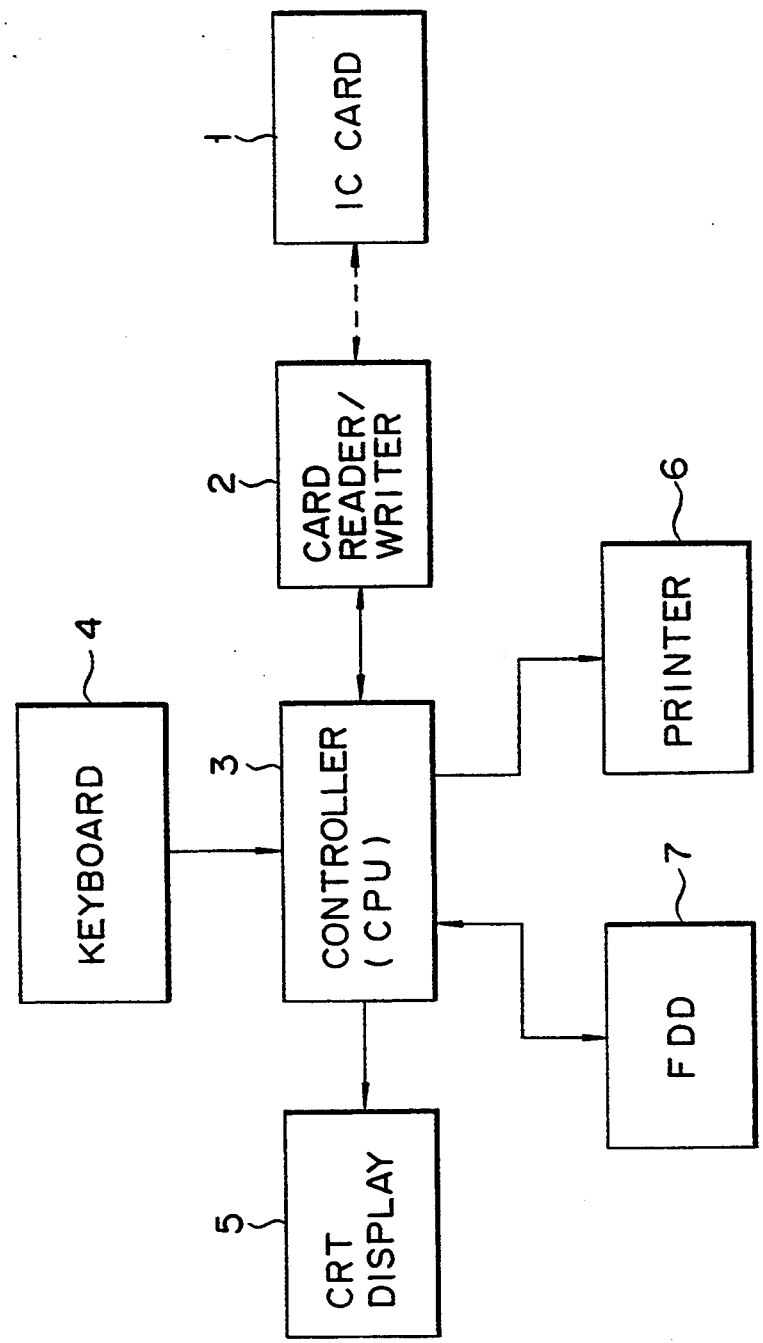
F I G. 1

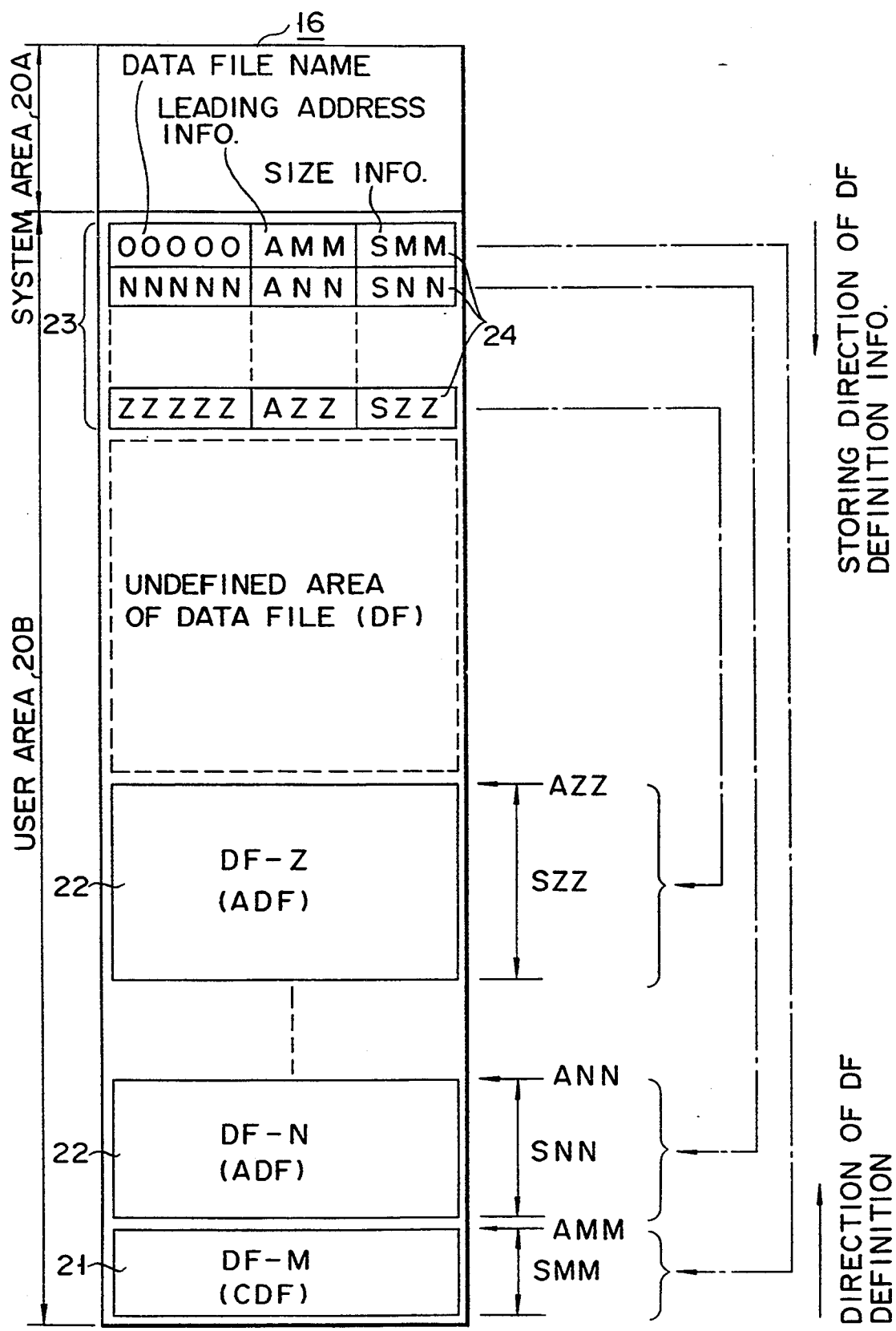
F I G. 4

| COMMAND CODE OF DF SELECTION | DF NAME |
|---|---|

F I G. 12

| COMMAND CODE OF AREA DEFINITION | AREA ID | ACCESS CONDITION INFO. | AREA SIZE INFO. |
|---|---|---|---|

F I G. 13

| READ COMMAND CODE | AREA ID |
|---|---|

F I G. 14A

| WRITE COMMAND CODE | AREA ID | WRITE DATA |
|---|---|---|

F I G. 14B

```
┌─────────────────┐
│ COMMAND CODE    │
│ OF USER AREA    │
│ INITIALIZATION  │
└─────────────────┘
```
FIG. 15
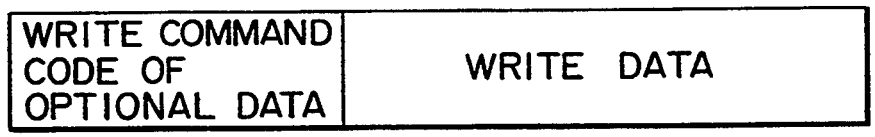
FIG. 16
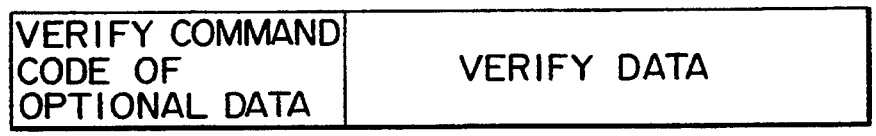
FIG. 17

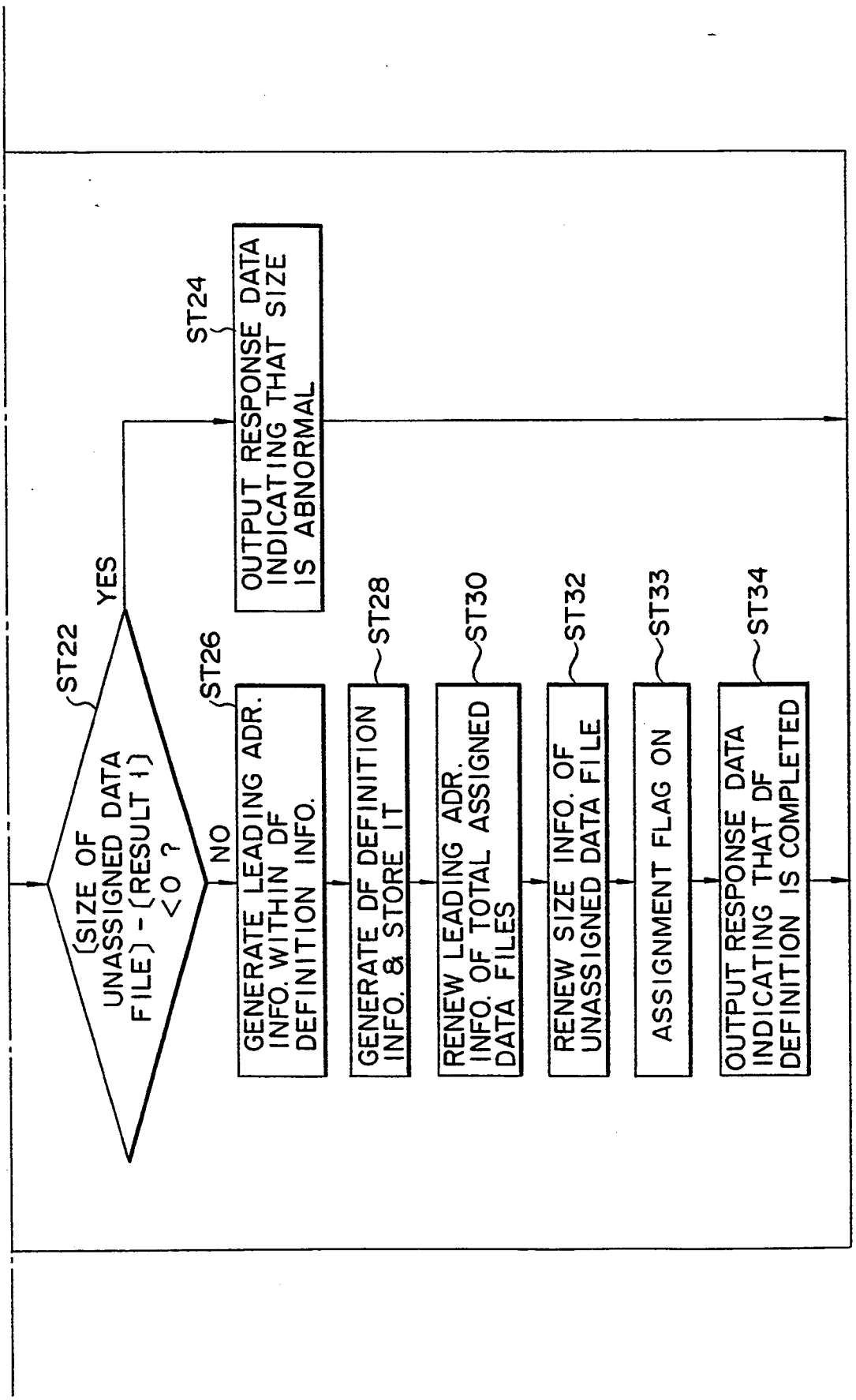

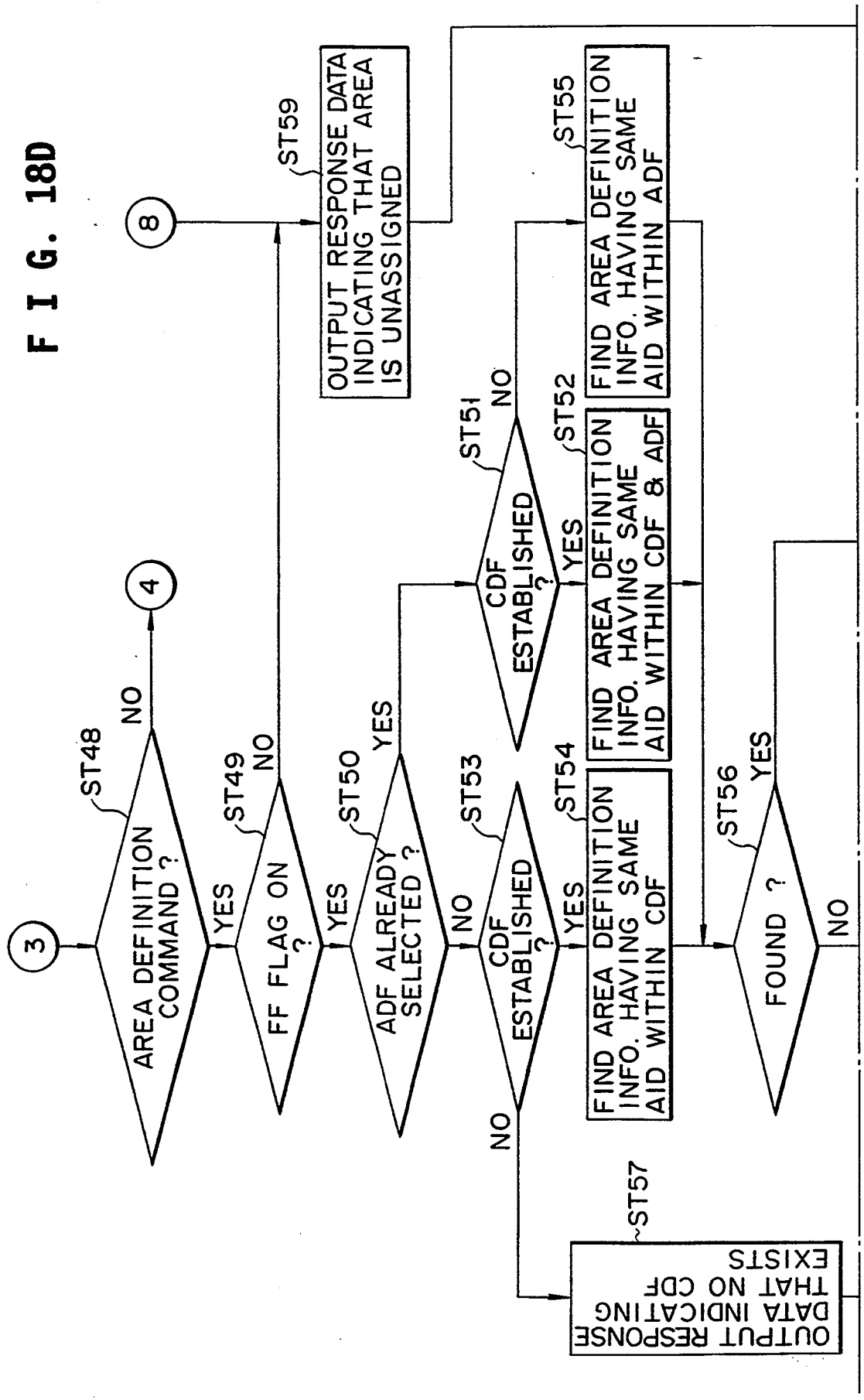

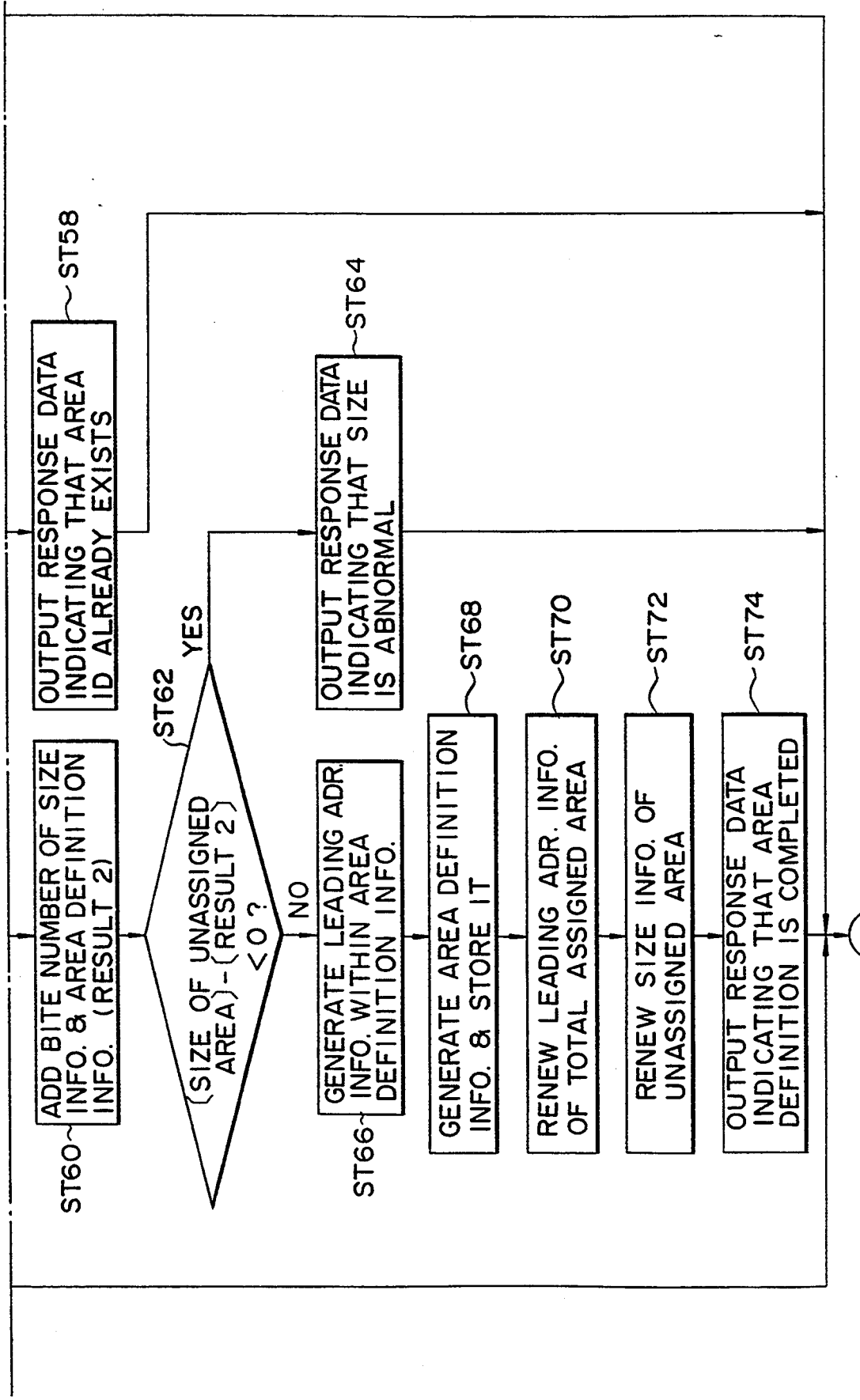

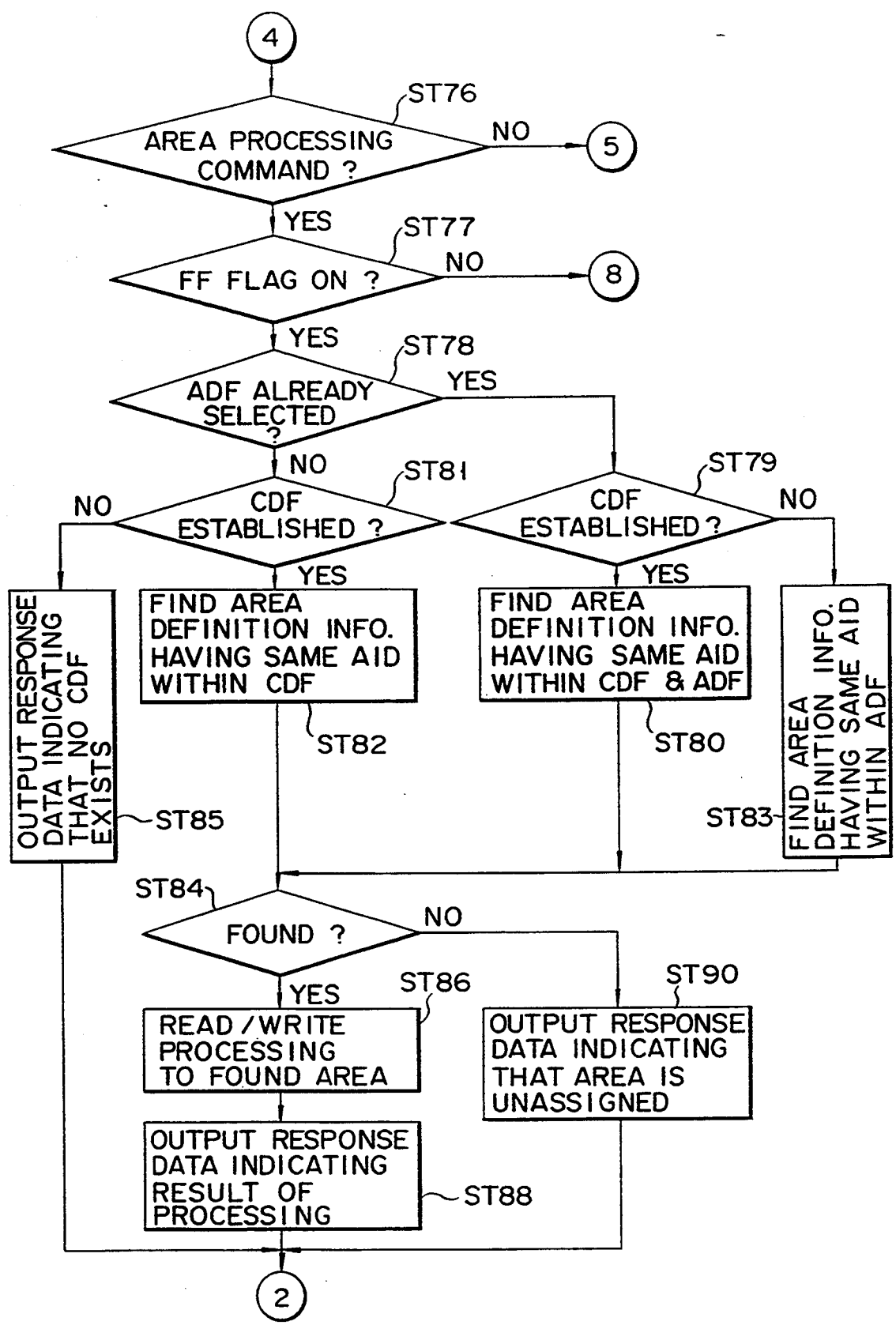
F I G. 18F

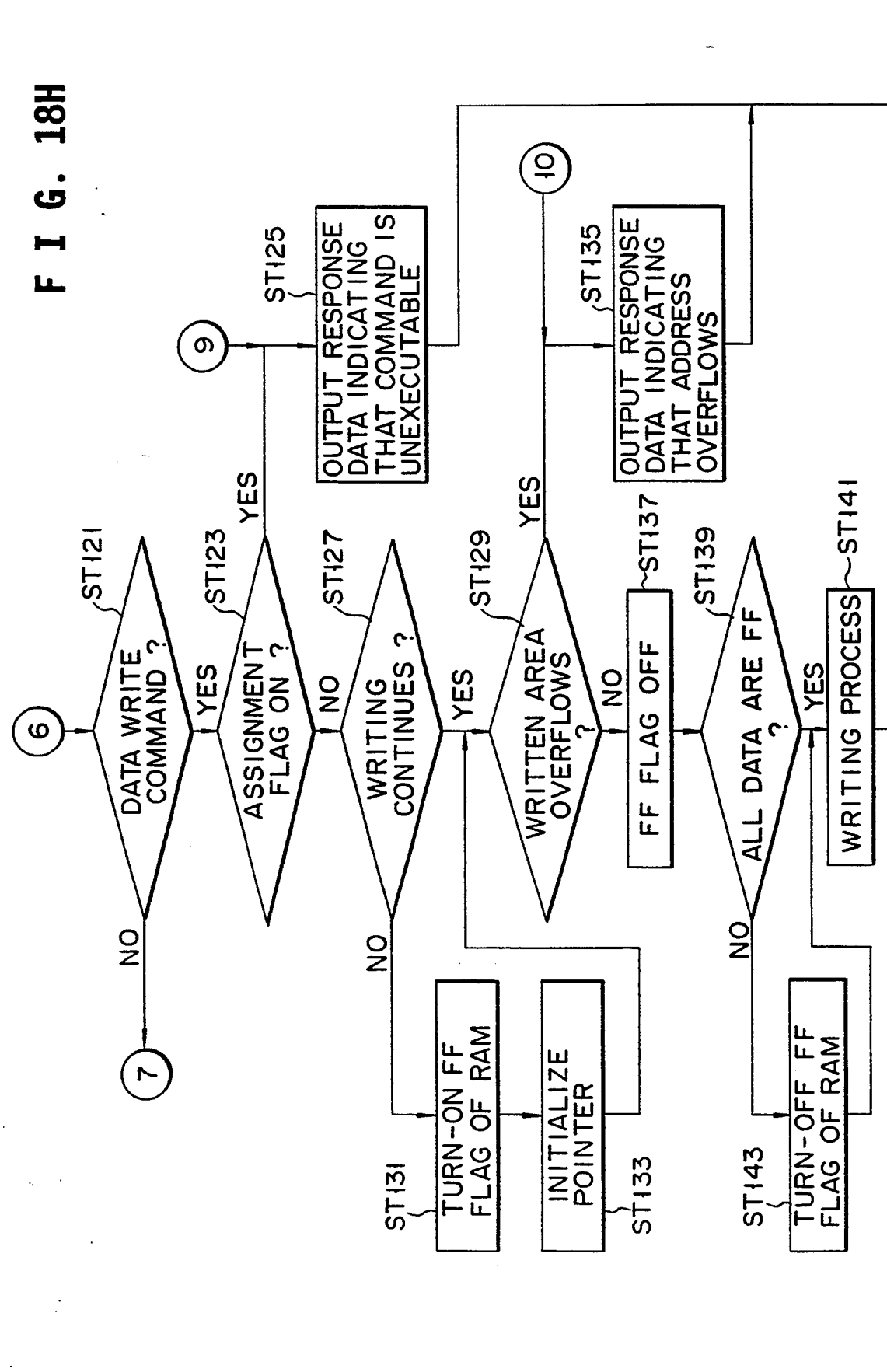

PORTABLE ELECTRIC DEVICE

BACKGROUND OF THE INVENTION

1. Field of the Invention

The present invention relates to a portable electronic device, a so-called IC card, which incorporates an IC (integrated circuit) chip having, e.g., a nonvolatile memory, and a control element such as a CPU and, more particularly, to a management method of a user area of the memory.

2. Description of the Related Art

In recent years, a so-called IC card which incorporates an IC chip having an erasable nonvolatile memory, and a control element such as a CPU has received a lot of attention as a new portable data storage medium. In an IC card of this type, an internal memory is accessed by an internal control element to selectively input/output data from/to an external device.

Recently, as the life cycle of such IC cards has been clarified, a card issuer often wants to register a constituting element such as an area or a data file designed by himself in an IC card. In this case, an operation of memory cells in a specific open area in a memory must be checked.

In this case, in one method, externally input optional data may be received and written in a predetermined area, and a memory cell error may be determined in accordance with the processing result. According to this method, however, it is not easy to find malfunctions of address and data bus signals supplied to the memory.

In another method, externally input optional data (e.g., increment data starting from "00") may be supplied to an IC card, and it may be checked if the data can be written in a memory. However, it is preferable that data in the memory has been initialized in the subsequent area registration mode.

In still another method, externally input optional data may be received, and may be written in a predetermined region or may be verified to check memory cells. However, if verification is able to be performed after area registration, this poses a problem in terms of security.

SUMMARY OF THE INVENTION

It is, therefore, the first object of the present invention to provide a portable electronic device which can check memory cells in an area open to a user, and can easily find malfunctions of address and data bus signals supplied to a memory unit.

It is the second object of the present invention to provide a portable electronic device with which even after optional data is written in a user open area, the area can be reliably set in an initial state when an area is registered.

It is the third object of the present invention to provide a portable electronic device which supports a memory cell check function of a user open area, and can disable the function after area registration, thus improving security.

In order to achieve the first object, according to the present invention, a portable electronic device which includes a memory unit having first and second storage areas, and a control unit for controlling the memory unit, and selectively performs a data input/output operation with an external device, comprises means for storing received data in the second storage area in accordance with externally input first command data, and comparison means for comparing received data with the data stored in the second storage area in accordance with externally input second command data.

In order to achieve the second object, according to the present invention, a portable electronic device which includes a memory unit having first and second storage areas, and a control unit for controlling the memory unit, and selectively performs a data input/output operation with an external device, comprises means for storing area definition information for dividing the second storage area into a plurality of areas in the second storage area in accordance with externally input first command data, means for storing received data in the second storage area in accordance with externally input second command data, detection means for detecting whether or not identical data is stored in the entire second storage area in accordance with the second command data, and control means for controlling in accordance with a detection result of the detection means whether or not processing by the first command data is executable.

In order to achieve the third object, according to the present invention, a portable electronic device which includes a memory unit having first and second storage areas, and a control unit for controlling the memory unit, and selectively performs a data input/output operation with an external device, comprises means for storing area definition information for dividing the second storage area into a plurality of areas in the second storage area in accordance with externally input first command data, means for storing received data in the second storage area in accordance with externally input second command data, comparison means for comparing received data with the data stored in the second storage area in accordance with externally input third command data, detection means for detecting whether or not the area definition information is stored in accordance with the first command data, and control means for controlling in accordance with a detection result of the detection means whether or not processing operations by the first and second command data are executable.

In the portable electronic device for achieving the first object, externally input optional data is stored in a user open area (second storage area), and is compared with another externally input optional data to check memory cells of the user open area. In this manner, malfunctions of address and data bus signals supplied to a memory unit can be easily found.

In the portable electronic device for achieving the second object, when externally input optional data is stored in a user open area (second storage area), control is performed to execute area registration processing after it is confirmed that the user open area is set in an initial state, i.e., all the data stored in the area are "FF". In this manner, even when optional data is written in the user open area, the area can be reliably set in an initial state when an area is to be registered.

In the portable electronic device for achieving the third object, verification of optional data is prohibited after area registration. In this manner, although the device supports a memory cell check function of a user open area, the function is disabled after area registration, thus improving security.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing an arrangement of a terminal device;

FIG. 4 shows a data file architecture in a data memory;

FIG. 12 shows a format of data file selection command data;

FIG. 13 shows a format of area definition command data;

FIG. 14A shows a format of read command data to an area;

FIG. 14B shows a format of write command data to an area;

FIG. 15 shows a format of user area initialization command data;

FIG. 16 shows a format of optional data write command data;

FIG. 17 shows a format of optional data verify command data; and

FIGS. 18A–18J are flow charts for explaining respective processing operations.

DETAILED DESCRIPTION OF THE PREFERRED EMBODIMENTS

Figure 2:
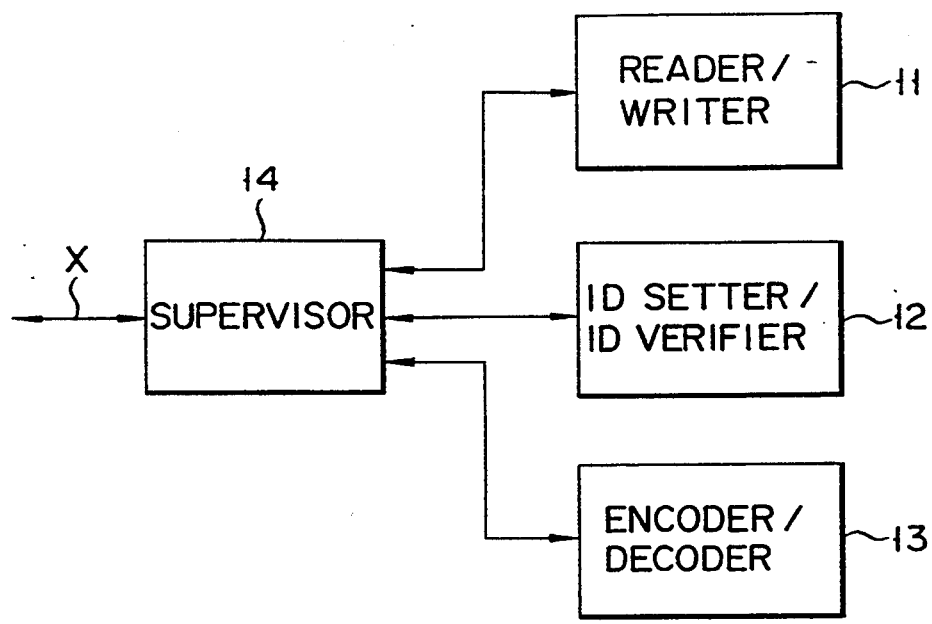
FIG. 2 is a block diagram showing function blocks of an IC card.

An embodiment of the present invention will be described hereinafter with reference to the accompanying drawings.

FIG. 1 shows an arrangement of a terminal device for processing an IC card as a portable electronic device according to the present invention. More specifically, the terminal device allows IC card 1 to be connected to control unit 3 comprising a CPU via card reader/writer 2, and is constituted by connecting keyboard 4, CRT display 5, printer 6, and floppy disk drive (FDD) 7 to control unit 3.

IC card 1 is used for referring to an identification (ID) number known by only a user, and for storing necessary data during, e.g., a purchase of a merchandise item. As shown in, e.g., FIG. 2 showing function blocks, IC card 1 comprises sections for executing basic functions (i.e., reader/writer 11, ID setter/ID verifier 12, and encoder/decoder 13), and supervisor 14 for managing these basic functions.

Reader/writer 11 has a function of performing a data read/write/erase operation for data memory 16, or the like.

ID setter/ID verifier 12 has a function of performing storage and read inhibition processing of an ID number set by a user, and a function of verifying the ID number after the number is set so as to permit the subsequent processing.

Encoder/decoder 13 has a function of encoding communication data to prevent the communication data from leaking or being counterfeited when data is transmitted from control unit 3 to another terminal device via a communication line, and a function of decoding encoded data, i.e., has a function of executing data processing in accordance with an encryption algorithm having a sufficient encryption power such as a DES (Data Encryption Standard).

Supervisor 14 has a function of decoding a function code input from card reader/writer 2, or a function code added with data, selecting a necessary one of the basic functions, and executing the selected function.

Figure 3:
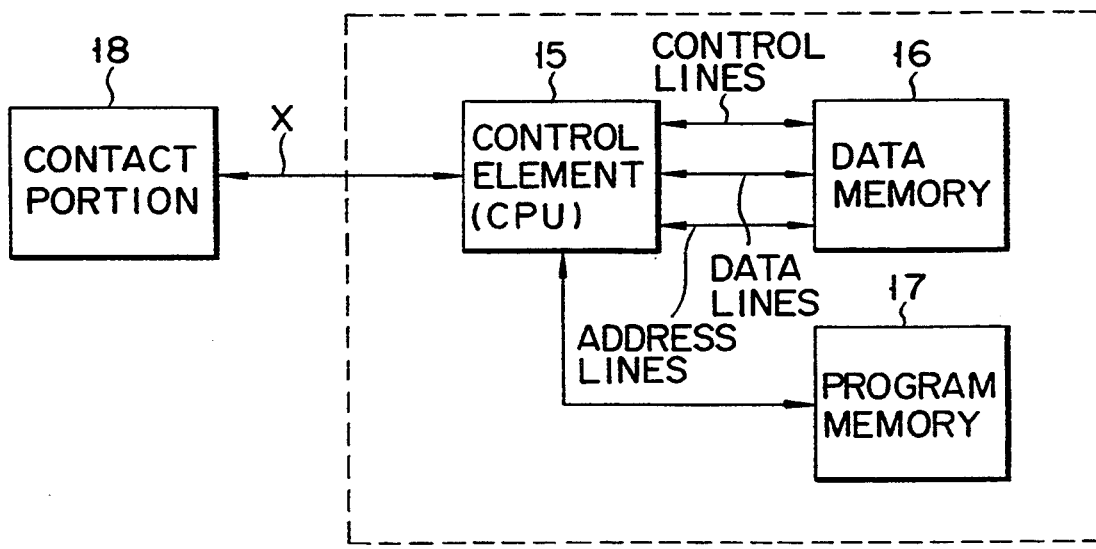
FIG. 3 is a block diagram showing an arrangement of the IC card.

In order to use these functions, IC card 1 is constituted by control element (control unit) 15 such as a CPU, data memory (memory unit) 16, program memory 17, and contact portion 18 for obtaining an electrical contact with card reader/writer 2, as shown in FIG. 3. Of these components, control element 15, data memory 16, and program memory 17 are constituted by a single IC chip (or a plurality of IC chips), and are embedded in an IC card main body.

Program memory 17 comprises, e.g., a mask ROM, and stores a control program for control element 15, which program has subroutines for realizing the basic functions.

Data memory 16 is used for storing various data, and comprises an erasable nonvolatile memory such as an EEPROM.

Data memory 16 is roughly classified into system area 20A for storing control data used for internal operations of the IC card, and user area 20B which can be formatted by a user, as shown in FIG. 4. System area 20A may further store manufacturer data such as a serial number being specific to the card, identification data of an issuer of the card, etc. These data can be registered to the system area when the card is manufactured. On the other hand, user area 20B may contain user specific information, for example, a user ID information, a result of user trading, etc. This information can be registered to the user area when the card is issued or when it is used by a user. Of these areas, user area 20B is roughly divided and defined as one common data file (CDF) 21 used commonly in all the applications, and a plurality of application data files (ADFs) 22 used in units of applications. These data files (DFs) 21 and 22 are defined by DF definition information 24 in data file definition table 23. In this case, DF definition information 24 is stored from one end (e.g., a leading address) of user area 20B, and DFs 21 and 22 defined by DF definition information 24 are defined from the other end (e.g., an end address) of user area 20B.

Figure 5:
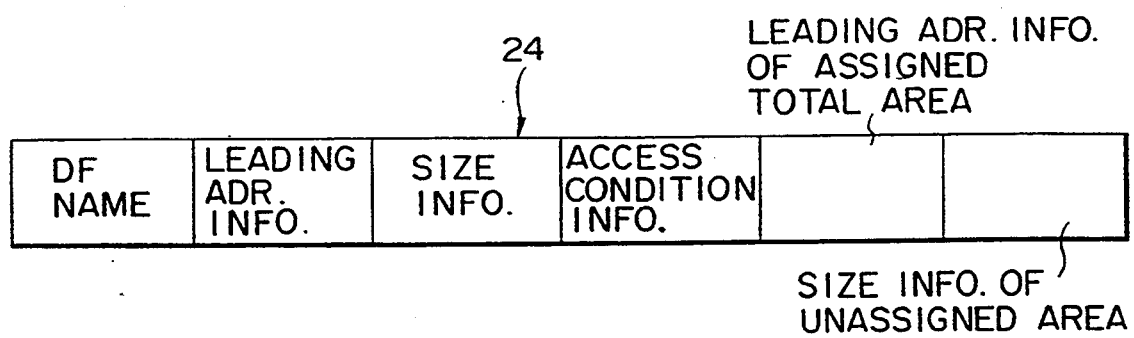
FIG. 5 is a view for explaining data file definition information.

DF definition information 24 is a data string indicating a correspondence among a DF name (DFN) as identification information for designating an area, leading address information, size information, access condition information on the memory where a DF is assigned, assigned total area leading address information, and unassigned area size information, as shown in, e.g., FIG. 5.

In a state wherein no area is defined in a defined DF, the value of the unassigned area size information indicates the maximum size of the corresponding DF, and the assigned total area leading address information has a value obtained by adding "1" to the end address of the corresponding DF.

DF definition information 24 is sequentially stored in response to DF definition command data (to be described later). In FIG. 4, a plurality of pieces of information 24 are stored in the order of DFNs "00000", "NNNNN", . . . , "ZZZZZ" in response to the command data. In particular, the DFN "00000" is reserved in the memory as the DFN of CDF 21.

Figure 6:
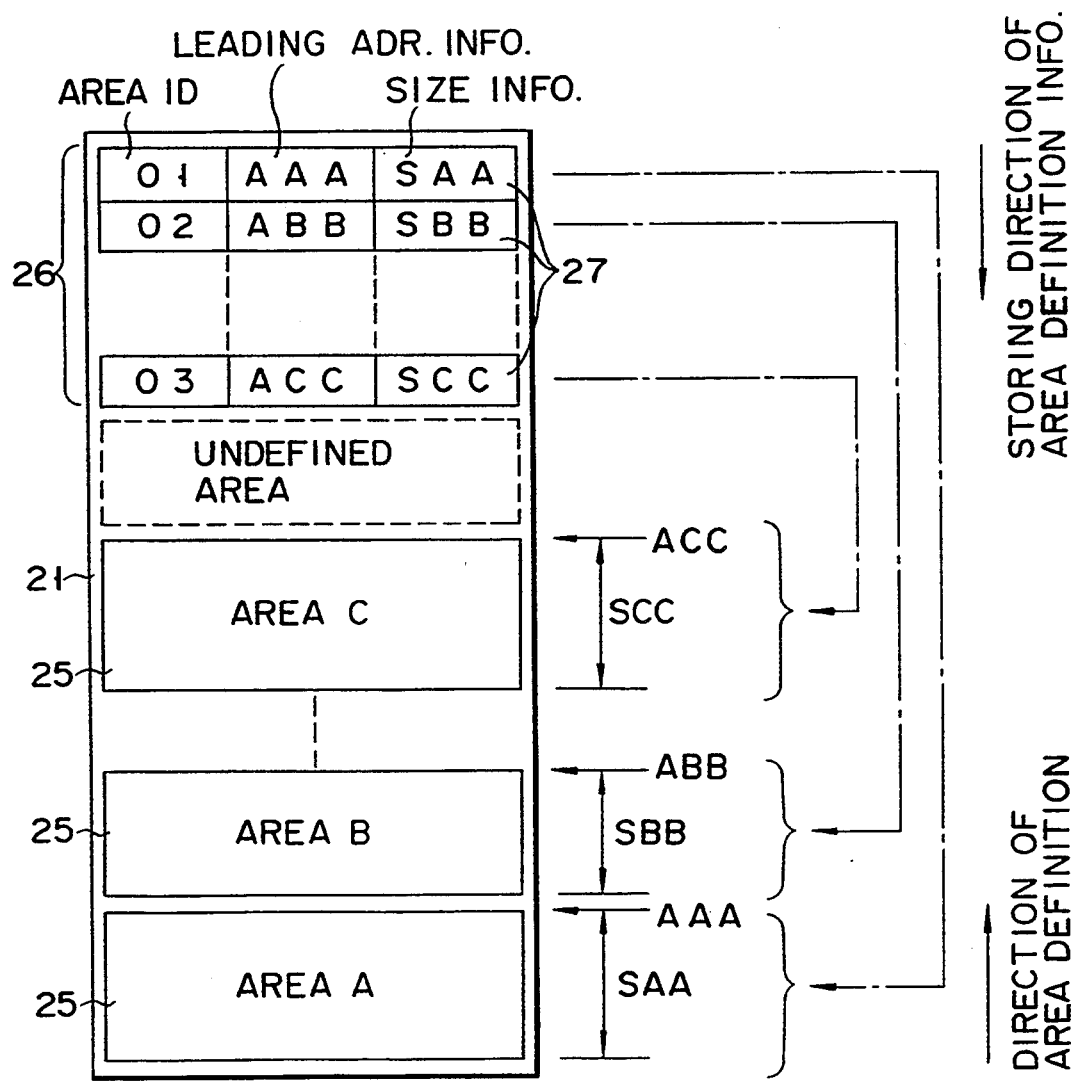
FIG. 6 shows an area architecture in a common data file.
Figure 7:
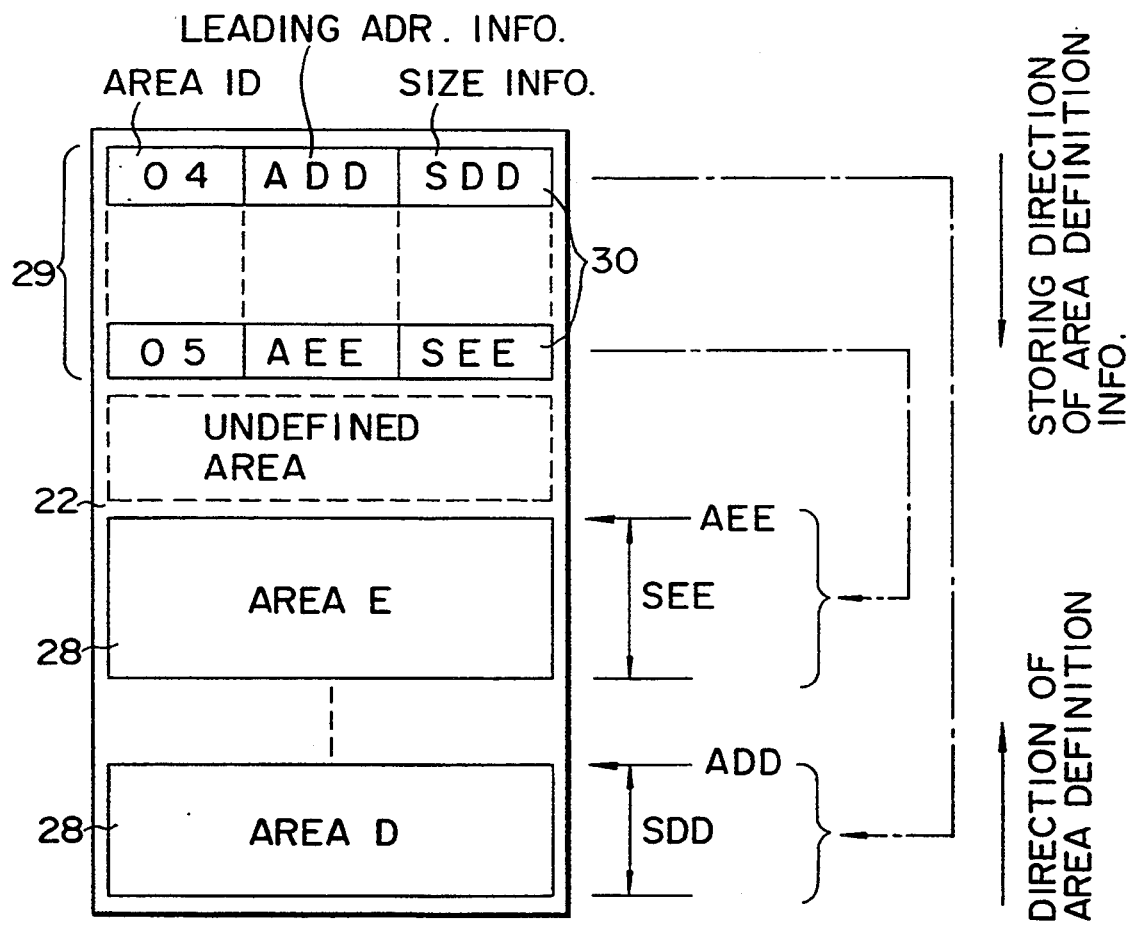
FIG. 7 shows an area architecture in an application data file.

CDF 21 is divisionally defined as a plurality of areas 25, as shown in FIG. 6, and each ADF 22 is divisionally defined as a plurality of areas 28, as shown in FIG. 7. These areas 25 and 28 are respectively defined by area definition information 27 and area definition information 30 of area definition tables 26 and 29. In this case, area definition information 27 and area definition information 30 are stored from one end portions (e.g., leading addresses) of DFs 21 and 22, and areas 25 and 28 respectively defined by area definition information 27 and area definition information 30 are defined from the other end portions (e.g., end addresses) of DFs 21 and 22.

Figure 8:
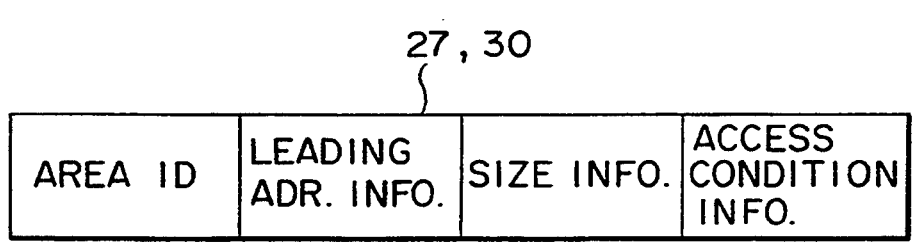
FIG. 8 is a view for explaining area definition information.

Each of area definition information 27 and area definition information 30 is a data string indicating a correspondence among an area identification number (AID) as identification information for designating an area, leading address information on the memory where the area is assigned, size information, and access condition information, as shown in FIG. 8.

Area definition information 27 and area definition information 30 are sequentially stored in response to area definition command data (to be described later). In FIG. 6, a plurality of pieces of information are stored in the order of AIDs "01", "02", . . . , "03" in response to the command data. In FIG. 7, a plurality of pieces of information are stored in the order of AIDs "04", . . . , "05" in response to the command data.

Figure 9:
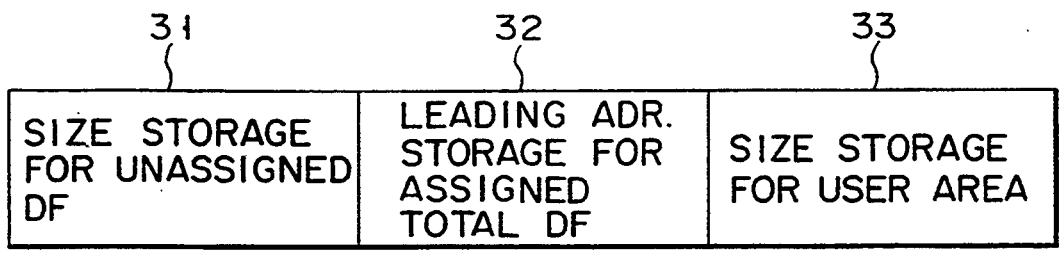
FIG. 9 is a view for explaining a size storage for an unassigned data file, a leading address size storage for assigned total data files, and a size storage for a user area.

FIG. 9 shows size storage 31 for an unassigned DF, for storing size information of an unassigned DF, leading address storage 32 for assigned total DFs, for storing leading address information of assigned total DFs, and size storage 33 for a user area, for storing size information of user area 20B. These storages are allocated in system area 20A.

In a state wherein no DF is assigned, the value of size information of an unassigned DF represents the maximum size for DF assignment allocated in data memory 16, i.e., a value defined by user area size information in size storage 33, and the leading address information of assigned total DFs has a value obtained by adding "1" to the end address of an area in data memory 16.

Figure 10:
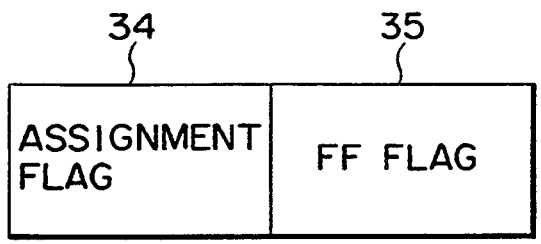
FIG. 10 is a view for explaining an assignment flag and an FF flag.

FIG. 10 shows assignment flag 34 and FF flag 35. Assignment flag 34 is turned off in an initial state, and is turned on when even one DF (to be described later) is defined. FF flag 35 is turned on in an initial state, and indicates that all the data in user area 20B are "FF".

The operation of the above arrangement will be described below with reference to the flow charts shown in FIGS. 18A to 18J.

Figure 11:
FIG. 11 shows a format of data file definition command data.

DF definition processing will be explained below with reference to FIG. 18A. In a steady state, external command data is set in a waiting state. When command data is input in this state (YES in ST10), control element 15 checks if the input command data is DF definition command data shown in FIG. 11 (ST12). If it is determined that the input command data is not DF definition command data (NO in ST12), control element 15 starts processing for determining another command data.

If it is determined that the input command data is DF definition command data (YES in ST12), control element 15 checks if FF flag 35 is ON (ST13). If it is determined that FF flag 35 is OFF (NO in ST13), control element 15 outputs response data indicating that no DF can be assigned (ST15), and is then set in a command data waiting state. However, if it is determined that FF flag is ON (YES in ST13), control element 15 finds DF definition information having the same DFN as that in the input command data from data memory 16 (ST14). If the DF definition information is found (YES in ST16), control element 15 outputs response data indicating that the input DFN already exists (ST18), and is then set in a command data waiting state.

If the DF definition information is not found (NO in ST16), control element 15 adds a byte number (size information) of the DF definition data to file size information in the command data to obtain the sum as result 1 (ST20), and compares the result 1 with a value in size storage 31. As a result of comparison, if it is determined that the value in size storage 31 is smaller than result 1 (YES in ST22, FIG. 18B), control element 15 determines that a DF to be defined by the input command data cannot be assigned in data memory 16, outputs response data indicating that the size is abnormal (ST24), and is set in a command data waiting state.

As a result of comparison, if it is determined that result 1 is equal to or smaller than the value in storage 31 (NO in ST22), control element 15 determines that a DF defined by the input command data can be assigned in data memory 16, and generates leading address information in DF definition information (ST26). The leading address information can be generated by internally calculating a sum of the value in leading address storage 32 and an address value corresponding to file size information in the input command data.

When the leading address information is generated in this manner, control element 15 generates DF definition information as a set of a DFN, access condition information, and file size information in the input command data, and the generated leading address information (ST28). If another DF definition information has already been stored, the generated DF definition information is stored at the next address. In this case, in a state wherein no DF is stored, DF definition information is stored from the leading address of user area 20B.

After the DF definition information is stored, control element 15 renews the value in leading address storage 32 with the presently stored leading address information (ST30). In addition, control element 15 subtracts the presently stored size information, and the byte number of the DF definition information from the value in size storage 31, and stores the difference in size storage 31 as new size information of an unassigned DF (ST32). Control element 15 turns on assignment flag 34 (ST33), outputs response data indicating that DF definition is completed (ST34), and is then set in a command data waiting state.

With this processing, a plurality of pieces of DF definition information 24 are sequentially stored in an area for DF assignment allocated in data memory 16 from smaller addresses, and DFs 21 and 22 defined by DF definition information 24 are sequentially stored from larger addresses, as shown in FIG. 4.

DF selection processing will be explained below with reference to FIG. 18C. As a result of checking whether or not the input command data is the DF definition command data, if it is determined that the input data is not the DF definition command data (NO in ST12 in FIG. 18A), control element checks if the input command data is DF selection command data shown in FIG. 12 (ST36). If it is determined that the input command data is not DF selection command data (NO in ST36), control elements 15 starts processing for determining another command data.

If it is determined that the input command data is DF selection command data (YES in ST36), control element 15 checks if FF flag 35 is ON (ST37). If it is determined that FF flag 35 is ON (NO in ST37), control element 15 outputs response data indicating that area is unassigned (ST59 in FIG. 18D), and is set in a command data waiting state. However, if it is determined that FF flag 35 is ON (YES in ST37), control element 15 finds DF definition information having the same DFN as that in the input command data from data memory 16 (ST38). If the corresponding information cannot be found (NO in ST40), control element 15 outputs response data indicating that a DF is undefined (ST46), and is then set in a command data waiting state.

If the corresponding information is found (YES in ST40), control element 15 stores the DF definition information in its internal RAM (ST42), and outputs response data indicating that DF selection is completed (ST44). Control element 15 is then set in a command data waiting state.

Area definition processing will be described below with reference to FIG. 18D. As a result of checking whether or not the input data is DF selection command data, if it is determined that the input data is not DF selection command data (NO in ST36 in FIG. 18C), control element 15 checks if the input data is area definition command data shown in FIG. 13 (ST48). If it is determined that the input data is not area definition command data (NO in ST48), control element 15 starts processing for determining another command data.

If it is determined that the input command data is area definition command data (YES in ST48), control element 15 checks if FF flag 35 is ON (ST49). If it is determined that FF flag 35 is OFF (NO in ST49), control element 15 outputs response data indicating that an area is unassigned, and is set in a command data waiting state. However, if it is determined that FF flag 35 is ON (YES in ST49), control element 15 looks up DF definition information stored in the RAM upon the DF selection to check if ADF 22 is selected (ST50).

If it is determined that ADF 22 is not selected (NO in ST50), control element 15 checks if CDF 21 is established (ST53). If it is determined that no CDF is established (NO in ST53), control element 15 outputs response data indicating that no CDF exits (ST57), and is set in a command data waiting state. However, if it is determined that the CDF is established (YES in ST53), control element 15 looks up the content of CDF 21 to find area definition information having the same area identification number (AID) as that in the input command data (ST54).

If it is determined in step ST50 that ADF 22 is selected (YES in ST50), control element 15 checks if CDF 21 is established (ST51). If it is determined that the CDF is established (YES in ST51), control element 15 looks up the contents of CDF 21 and selected ADF 22 to find area definition information having the same area identification number (AID) as that in the input command data (ST52). However, if it is determined that no CDF 21 is established (NO in ST51), control element 15 looks up the content of ADF 22 to similarly find area definition information (ST55).

As a result, if the area definition information is found (YES in ST56), control element 15 outputs response data indicating that the AID already exists (ST58), and is then set in a command data waiting state.

If no information is found (NO in ST56), control element 15 adds the byte number (size information) of the area definition information to area size information in the input command data to obtain the sum as result 2 (ST60, in FIG. 18E), and compares result 2 with size information of an unassigned area in the DF definition information (ST62).

In this case, if ADF 22 is not selected (NO in ST50), size information of an unassigned area in DF definition information defining CDF 21 is used in comparison. If ADF 22 is selected (YES in ST50), size information of an unassigned area in DF definition information defining selected ADF 22 is used in comparison.

As a result of comparison, if an unassigned area size is smaller than result 2 (YES in ST62), control element 15 determines that an area defined by the input command data is not assigned in this DF, outputs response data indicating that the size is abnormal (ST64), and is set in a command data waiting state.

As a result of comparison, if result 2 is equal to or larger than an unassigned area size (NO in ST62), control element determines that an area defined by the input command data can be assigned in the DF, and generates leading address information in area definition information (ST66). The leading address information can be generated by internally calculating a sum of leading address information of assigned total areas, and an address value corresponding to area size information in the input command data.

In this case, if ADF 22 is not selected (NO in ST50), leading address information of assigned total areas in DF definition information defining CDF 21 is added. If ADF 22 is selected (YES in ST50), leading address information of assigned total areas in DF definition information defining selected ADF 22 is added.

After the leading address information is generated in this manner, control element 15 generates area definition information as a set of an AID, access condition information, and area size information in the input command data, and the generated leading address information (ST68). If another area definition information has already been stored, new information is stored at the next address. In this case, in a state wherein no area is defined, area definition information is stored from the leading address of the DF.

After area definition information is stored, control element 15 renews leading address information of assigned total areas in DF definition data with the presently stored leading address information (ST70). In addition, control element 15 subtracts the presently stored size information, and the byte number of area definition information from size information of an unassigned area in the DF definition information, and stores the difference as new size information of an unassigned area (ST72). Control element 15 then outputs response data indicating that area definition is completed (ST74), and is set in a command data waiting state.

With this processing, area definition information 27 and area definition information 30 are sequentially stored in defined DFs 21 and 22 from smaller addresses, and areas 25 and 28 defined by area definition information 27 and area definition information 30 are sequentially defined from larger addresses, as shown in FIGS. 6 and 7.

Area processing (intra-area data read/write processing) will be described below with reference to FIG. 18F. As a result of checking whether or not the input command data is area definition command data, if it is determined that the input data is not area definition command data (NO in ST48 in FIG. 18D), control element 15 checks if the input command data is read command data shown in FIG. 14A or write command shown in FIG. 14B (ST76). If it is determined that the input command data is not area processing command data shown in FIG. 14A or 14B (NO in ST76), control element 15 starts processing for determining another command data.

If it is determined that the input command data is area processing command data (YES in ST76), control element 15 checks if FF flag 35 is ON (ST77). If it is determined that FF flag 35 is OFF, control element 15 outputs response data indicating that an area is unassigned (ST59 in FIG. 18D), and is set in a command data waiting state. However, if it is determined that FF flag 35 is ON, control element 15 looks up DF definition information stored in the RAM upon the DF selection to check if ADF 22 is selected (ST78).

As a result of checking, if ADF 22 is not selected (NO in ST78), control element 15 checks if CDF 21 is established (ST81). If it is determined that no CDF is established (NO in ST81), control element 15 outputs response data indicating that no CDF exists, and is set in a command data waiting state. If it is determined that the CDF is established (YES in ST81), control element 15 looks up the content of CDF 21 to find area definition information having the same area identification number (AID) as that in the input command data (ST82).

As a result of checking, if ADF 22 is selected (YES in ST78), control element 15 checks if CDF 21 is established (ST79). If it is determined that the CDF is established (YES in ST79), control element 15 looks up the contents of CDF 21 and selected ADF 22 to find area definition information having the same area identification number (AID) as that in the input command data (ST80). However, if it is determined that no CDF 21 is established (NO in ST79), control element 15 looks up the content of ADF 22 to similarly find area definition information (ST83).

As a result, if no information is found (NO in ST84), control element 15 outputs response data indicating that an area is undefined, and is then set in a command data waiting state.

If the information is found (YES in ST84), control element 15 acquires information of the position of the target area on the memory based on the found area definition information, and executes read or write processing for the area (ST86). After the area processing is completed, control element 15 outputs the processing result as response data (ST88), and is then set in a command data waiting state.

User area initialization processing will be described below with reference to FIG. 18G. As a result of checking whether or not the input command data is area processing command data, if it is determined that the input command data is not area processing command data (NO in ST76 in FIG. 18F), control element 15 checks if the input command data is user area initialization command shown in FIG. 15 (ST101). As a result of checking, if it is determined that the input command data is not user area initialization command data (NO in ST101), control element 15 starts processing for determining another command data.

As a result of checking, if it is determined that the input command data is user area initialization command data (YES in ST101), control element 15 turns off FF flag 35 (ST103). Thereafter, control element 15 recognizes user area 20B in data memory 16 on the basis of size information in size storage 33, and sequentially fills user area 20B with data "FF" or "00" (hexadecimal notation) from its leading address (ST105). At this time, a check for verification is performed by a read after write scheme (ST107). If an abnormality is found (NO in ST109), control element 15 outputs response data indicating that a fill operation of data "FF" fails (ST119), and is then set in a command data waiting state.

If it is determined that the check for verification is OK (YES in ST109), i.e., if the entire user area is filled with data "FF", control element 15 turns on FF flag 35 (ST111), and sets assignment flag 34 OFF (ST113). Thereafter, control element 15 initializes the contents of size storages 31 and 32 (ST115), outputs response data indicating that initialization is completed normally (ST117), and is then set in a command data waiting state.

Processing for writing optional data in user area 20B will be described below with reference to FIG. 18H. As a result of checking whether or not the input command data is user area initialization command data, if it is determined that the input command data is not user area initialization command data (NO in ST101 in FIG. 18G), control element 15 checks if the input command data is optional data write command data (ST121). As a result of checking, if it is determined that the input command data is not optional data write command data (NO in ST121), control element 15 starts processing for determining another command data.

As a result of checking, if it is determined that the input command data is optional data write command data (YES in ST121), control element 15 checks if assignment flag 34 is ON (ST123). If it is determined that assignment flag 34 is ON (YES in ST123), control element 15 outputs response data indicating that the command is unexecutable (ST125), and is set in a command data waiting state. However, if it is determined that flag 34 is OFF (NO in ST123), control element 15 checks if a command continue flag on the internal RAM is ON (ST127). If it is determined that the flag is OFF (NO in ST127), control element 15 turns on the FF flag on the RAM (ST131), and initializes a writing pointer (i.e., sets the pointer at the leading address of the user area) (ST133).

Thereafter, it is checked if all the presently received write data can be written in the user area from an address indicated by a pointer (ST129). If it is determined in checking of the continue flag (ST127) that the flag is ON, the flow immediately jumps to this step (ST129). If it is determined that the area overflows (YES in ST129), control element 15 outputs response data indicating that an address overflows (ST135), and is then set in a command data waiting state.

However, if it is determined that the area will not overflow (NO in ST129), control element 15 turns off FF flag 35 (ST137), and checks if all the presently received write data are "FF" (ST139). If it is determined that all the data are not "FF" (NO in ST139), control element 15 turns off the FF flag on the RAM (ST143); otherwise (YES in ST139), control element 15 directly starts writing processing (ST141). In this writing processing, if it is determined that writing is not properly completed (NO in ST145, FIG. 18I), control element 15 outputs response data indicating that writing fails (ST149), and is then set in a command data waiting state.

If it is determined that writing is completed properly (YES in ST145), control element 15 renews the writing pointer (ST147), and then checks if the renewed pointer overflows the user area (ST151). If it is determined that the pointer does not overflow (NO in ST151), control element 15 turns on the command continue flag on the internal RAM (ST155), outputs response data indicating a normal operation (ST157), and is then set in a command data waiting state.

As a result of checking, if it is determined that the pointer overflows (YES in ST151), control element 15 turns off the command continue flag on the internal RAM (ST153), and turns on FF flag 35 (ST161) only when FF flag 35 on the internal RAM is ON (YES in ST159). Control element 15 outputs response data indicating that an operation is completed normally (ST163), and is then set in a command data waiting state.

Figure 18A:
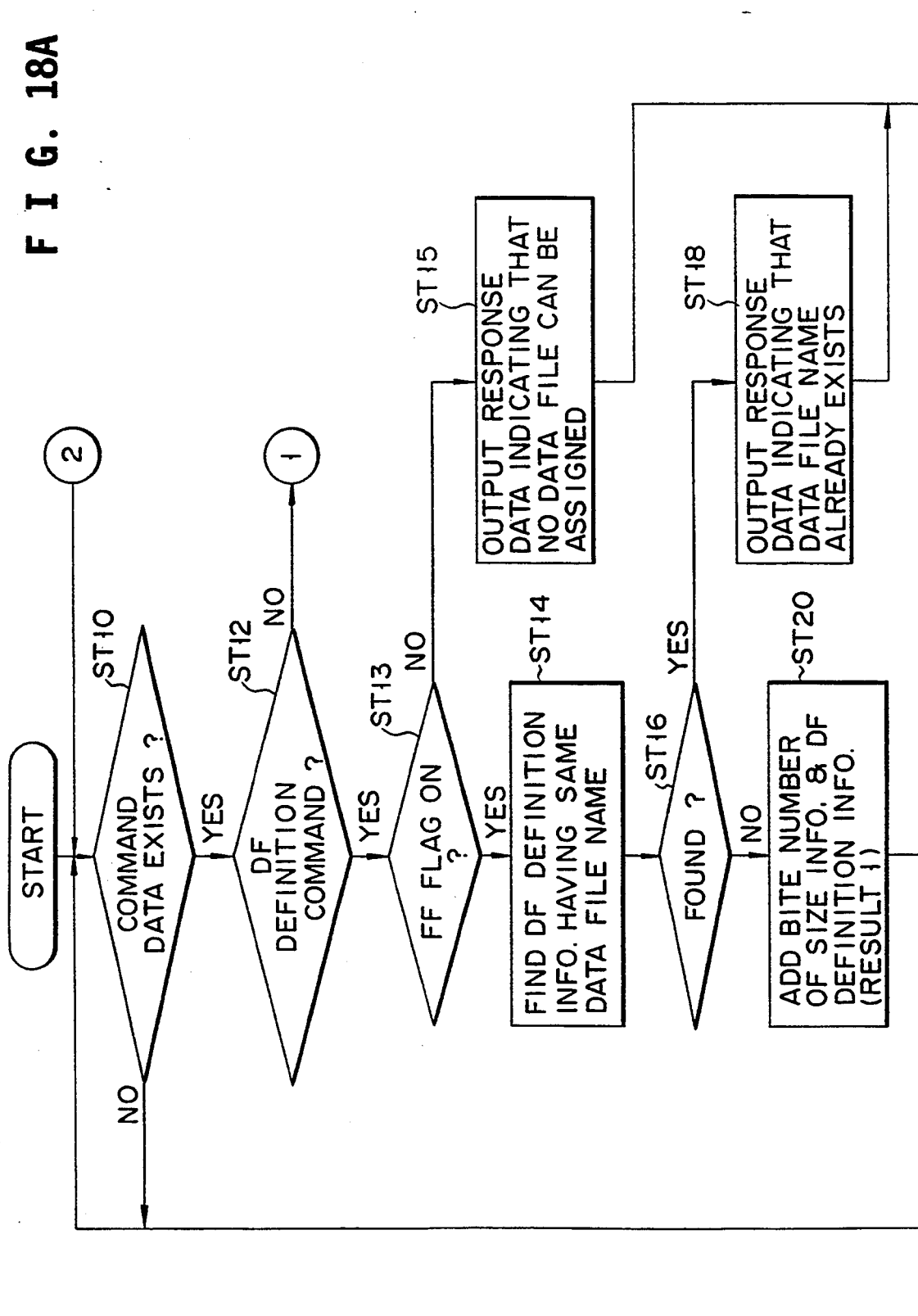
Figure 18C:
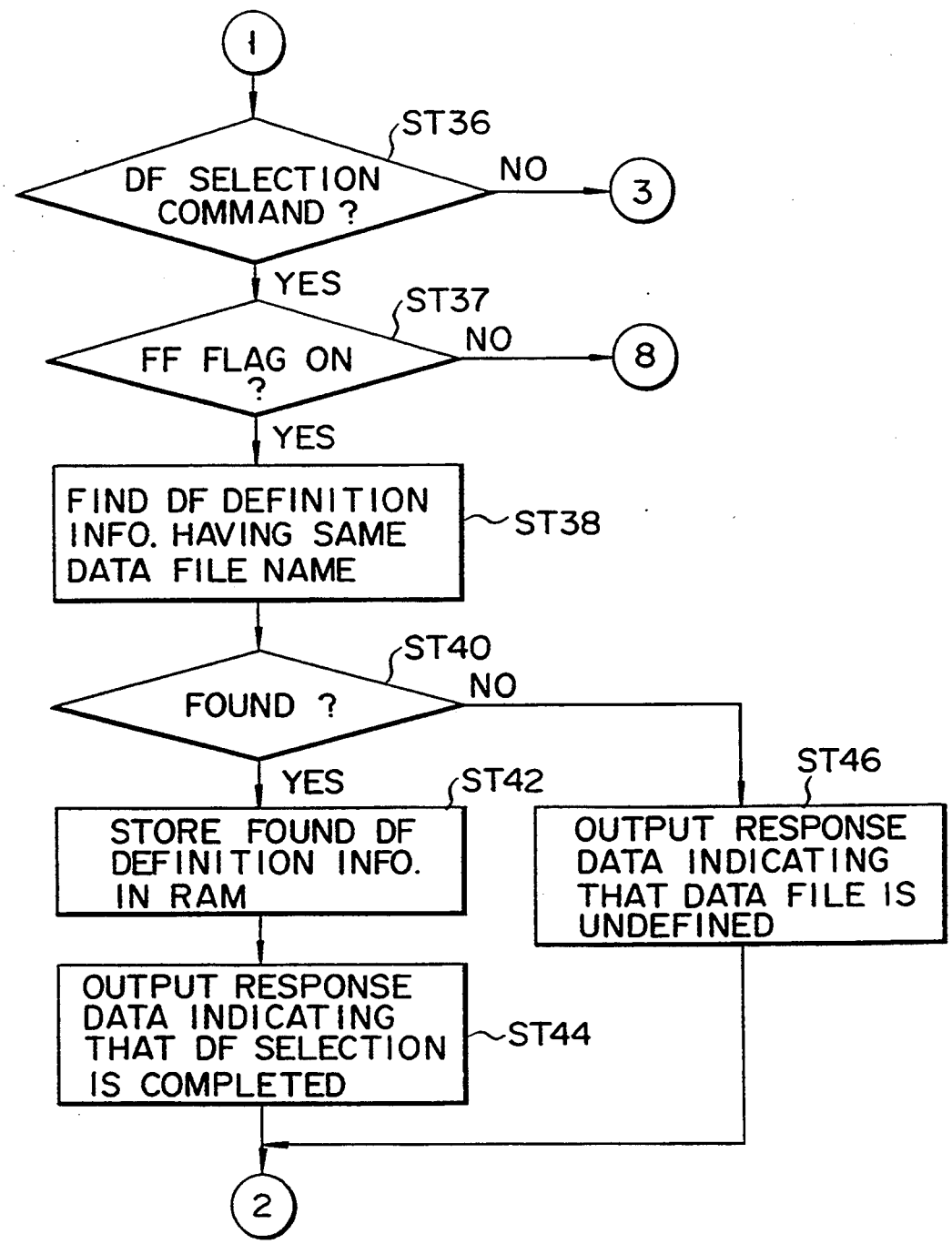
Figure 18G:
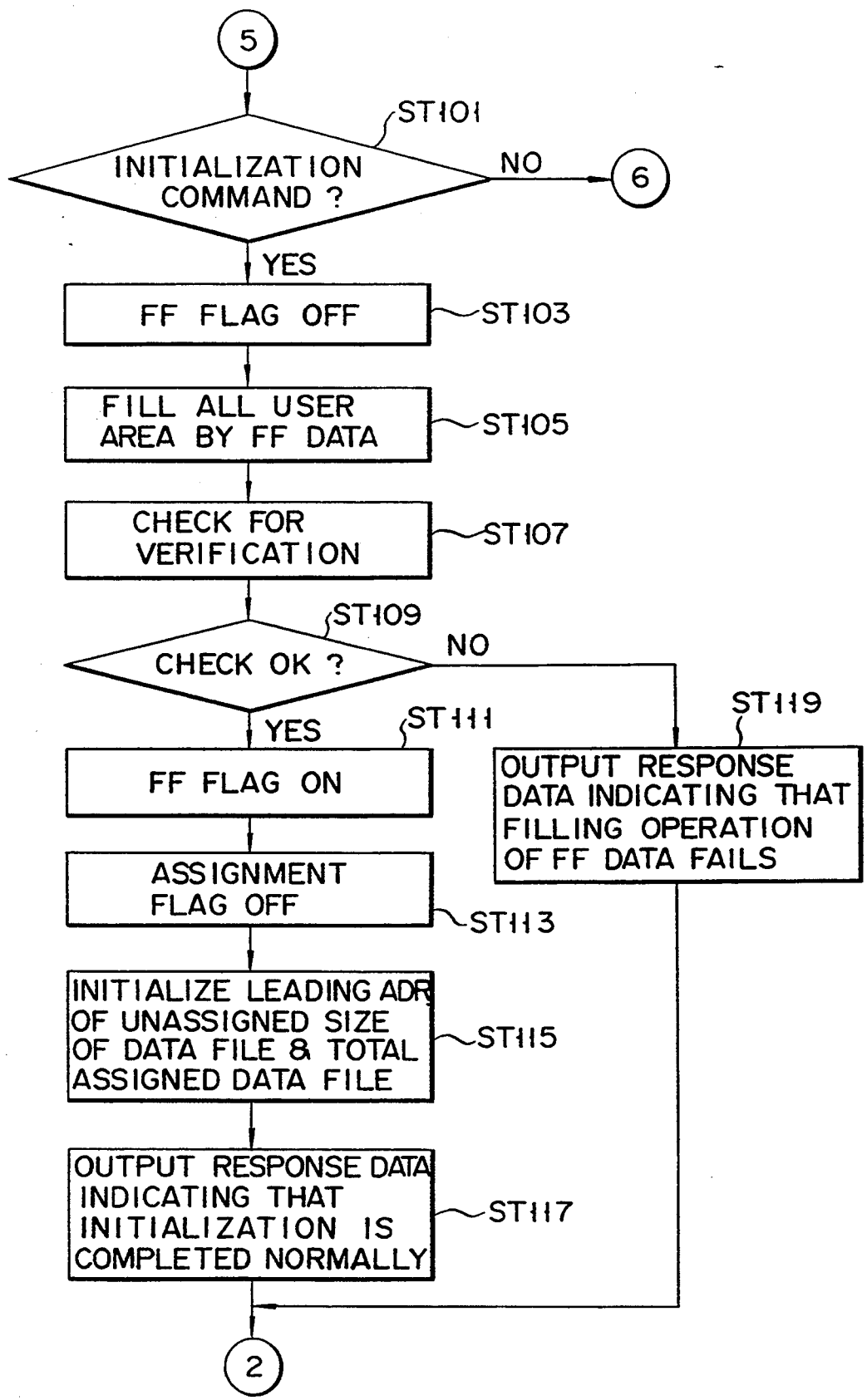

Processing for verifying data in user area 20B using input data will be described below with reference to FIG. 18J. As a result of checking whether or not the input command data is optional data write command data, if it is determined that the input command data is not optional data write command data (NO in ST121 in FIG. 18H), control element 15 checks if the input command data is optional data verify command data shown in FIG. 17 (ST165). As a result of checking, if it is determined that the input command data is not optional data verify command data (NO in ST165), control element 15 outputs response data indicating that command data is abnormal (ST169), and is then set in a command data waiting state.

As a result of checking, however, if it is determined that the input command data is optional data verify command data (YES in ST165), control element 15 checks if assignment flag 34 is ON (ST167). If it is determined that flag 34 is ON (YES in ST167), control element 15 outputs response data indicating that the command data is unexecutable (ST125 in FIG. 18H), and is set in a command data waiting state. If it is determined that the flag is OFF (NO in ST167), control element 15 checks if the command continue flag on the internal RAM is ON (ST171), and initializes the pointer (ST175) in the same manner as described above (ST133) only when it is determined that the flag is OFF (NO in ST171). Thereafter, control element 15 checks if all the presently received verify data are for data in the user area from an address indicated by the pointer (ST173). If it is determined that the verify data overflows the user area (YES in ST173), control element 15 outputs response data indicating that an address overflows (ST135 in FIG. 18H), and is then set in a command data waiting state.

As a result of checking, if it is determined that all the data can be verified (NO in ST173), control element 15 performs a check for verification from the address indicated by a pointer (ST177). This verification can be executed by comparing data written into the memory with the corresponding data read therefrom. As a result, if a verification error occurs (NO in ST179), control element 15 outputs response data indicating the verification error (ST183), and is set in a command data waiting state. As a result of the check for verification, if it is determined that verification is normal (YES in ST179), control element 15 renews the pointer (ST181), and then checks if the renewed pointer overflows the user area (ST185). If it is determined that the pointer does not overflow (NO in ST185), control element 15 turns on the command continue flag on the internal RAM (ST189), outputs response data indicating a normal operation (ST157 in FIG. 18I), and is then set in a command data waiting state. As a result of checking, if it is determined that the pointer overflows (YES in ST185), control element 15 turns off the command continue flag on the internal RAM (ST187), outputs response data indicating that an operation is completed normally (ST163 in FIG. 18I), and is then set in a command data waiting state.

In the above embodiment (FIGS. 4 and 6), DF definition information is stored from smaller addresses of the user area, and DFs defined by the DF definition information are sequentially defined from larger addresses. In contrast to this, DF definition information may be sequentially stored from larger addresses, and DFs may be sequentially defined from smaller addresses. The same applies to a storage method of area definition information in each DF, and area definition.

Figure 18I:
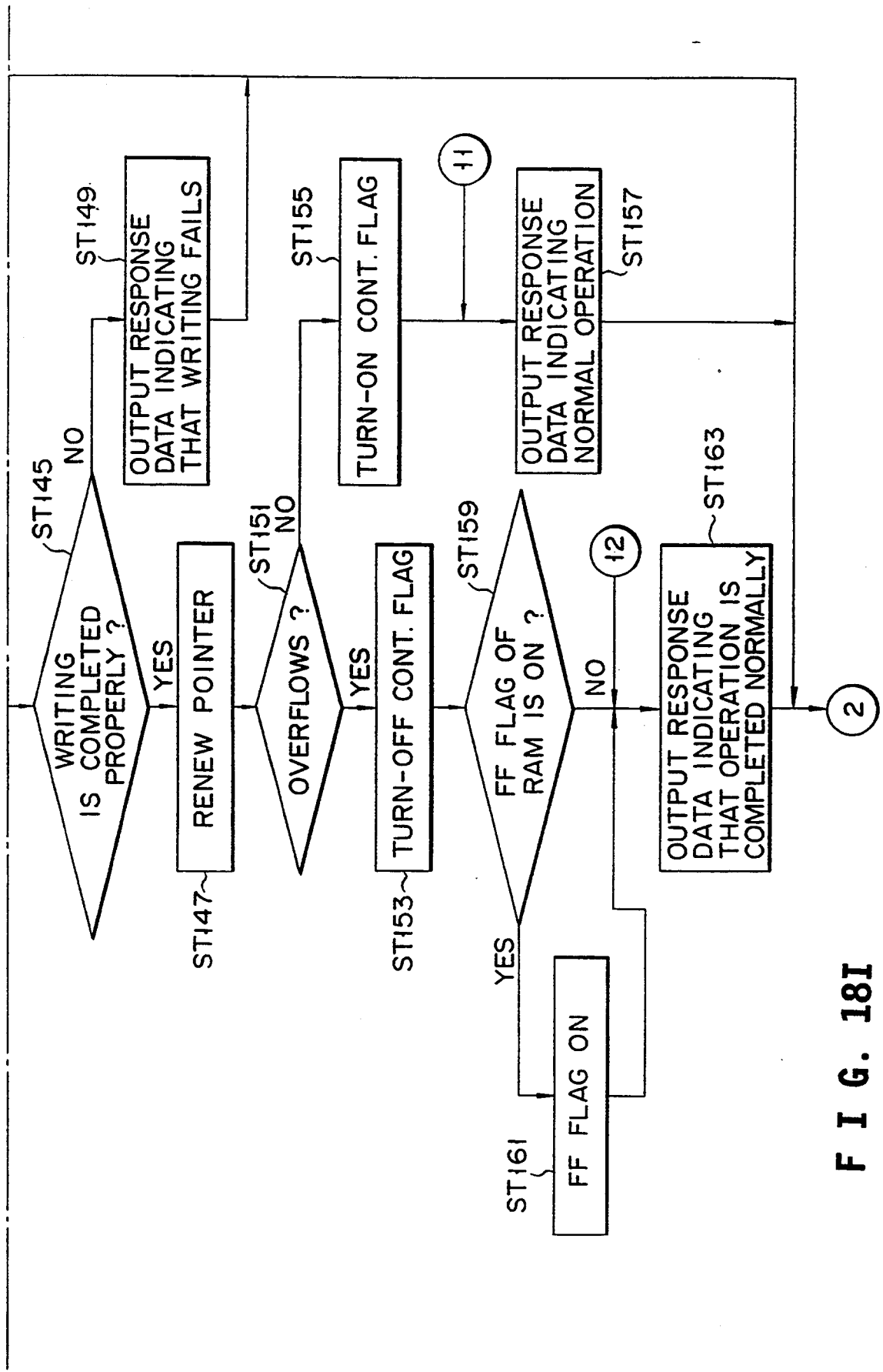
Figure 18J:
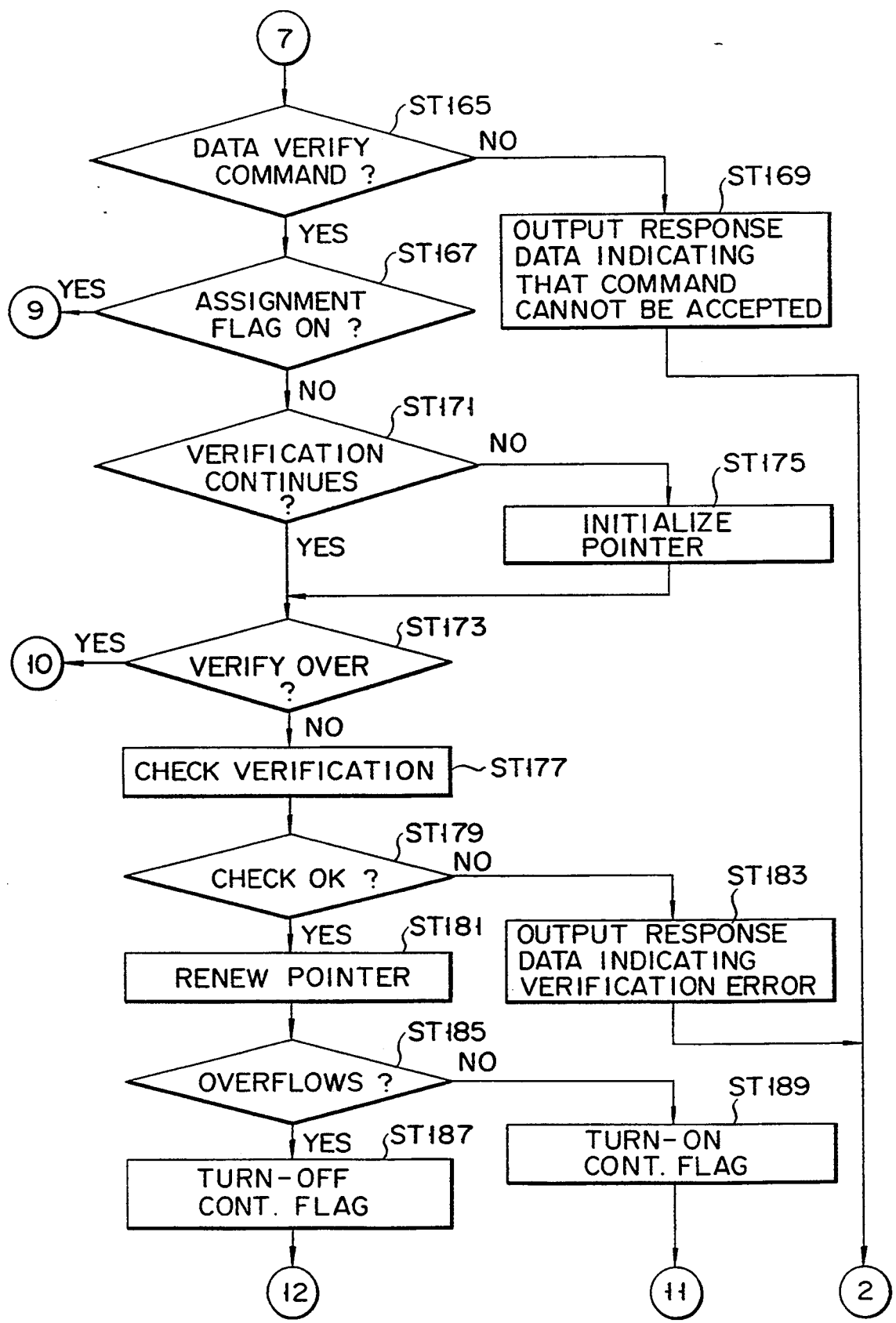

The above embodiment has the following operational features:

(1) When an IC card is issued or reissued, a memory of the card is checked, data files (DFs) are set, and areas thereof are set by means of an IC card issuing machine (FIG. 1);

(2) An IC card is internally initialized (FIG. 18G) by the card itself in response to an initialization command from the IC card issuing machine, wherein the setting of each of DFs and areas is enabled since the FF flag is ON while the assignment flag is OFF;

(3) When an issuer of an IC card checks a memory of the card, optional data is written and a verification thereof is performed, wherein the check can be done only if the assignment flag is OFF or the DF is undefined;

(More specifically, an optional data write command and write data (FIG. 16) are output from the IC card issuing machine, and the IC card writes the optional data into its memory (FIGS. 18H–18I). Thereafter, an optional data verify command and verify data (FIG. 17) are output from the IC card issuing machine, and the IC cards compares the verify data with the data written in the memory (FIG. 18J). If the verification is passed, the FF flag is turned ON and the assignment flag is turned OFF.)

(4) DF setting (FIG. 18A) and area setting (FIGS. 18D–18E) are performed after the above optional data writing and verification are completed, wherein the assignment flag is turned ON by the DF setting; and (5) After the DF setting (FIG. 18A) and area setting (FIGS. 18D–18E) are completed, a given DF with a prescribed area in the memory can be written or read by means of a DF selection (FIG. 18C) and an area selection (FIG. 18F).

Incidentally, the order of performing above features (2) and (3) may be exchanged, provided that the memory has been initialized before area definition information is written thereto. Thus, when the optional data is hexadecimal "FF", feature (3) is sufficient and feature (2) can be omitted. If the optional data is not hexadecimal "FF", then feature (3) is executed prior to feature (2), and feature (4) is executed after feature (2).

As described above, according to the portable electronic device of the present invention, externally input optional data is stored in a user open area, and is compared with another externally input optional data, thus checking memory cells in the user open area. In addition, malfunctions of address and data bus signals supplied to the memory unit can be easily found.

According to the portable electronic device of the present invention, when externally input optional data is stored in the user open area, control is performed to execute area registration processing after it is confirmed that the user open area is set in an initial state, i.e., all the data stored in the area are "FF" (or "00"). In this manner, even when optional data is written in the user open area, the area can be reliably set in an initial state when an area is to be registered.

According to the portable electronic device of the present invention, verification of optional data is prohibited after area registration. In this manner, although the device supports a memory cell check function of a user open area, the function is disabled after area registration, thus improving security.

Note that portable electronic devices to which the present invention can be applied include a handy terminal, an electronic notebook, a note type personal computer, and the like in addition to an IC card. In this case, each of these electronic devices has at least an arithmetic control function corresponding to a CPU or equivalent, and a memory, and the memory stores a common data file (CDF) and application data files (ADFs) or their equivalents.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A portable electronic device connectable to an external device, comprising:
   a memory including a system area for storing system information relating to a manufacturer of the portable electronic device, and a user area for storing user information relating to a user of the portable electronic device;
   first receiving means for receiving a first command and first predetermined data from said external device;
   means for storing said first predetermined data in all of said user area in response to said first command received by said first receiving means;
   second receiving means for receiving a second command and second predetermined data from said external device;
   means for comparing said first predetermined data stored in all of said user area with said second predetermined data received by said second receiving means;
   means for storing area definition information for dividing said user area into a plurality of storage areas based on a third command; and
   means for inhibiting the comparing of said first and second predetermined data by said comparing means after said area definition information is stored in said user area.

2. A device according to claim 1, further comprising means for, when no coincidence between said first and second predetermined data is found by said comparing means, indicating that any of said memory data lines of said memory and address lines of said memory are malfunctioning.

3. A device according to claim 1, further comprising means for filling said user area with identical data on the basis of a predetermined initialization command.

4. A device according to claim 3, further comprising means for checking whether or not said user area is filled with said identical data.

5. A device according to claim 4, further comprising third receiving means for receiving a third command for writing to or reading from said external device.

6. A device according to claim 5, wherein said checking means includes means for determining whether or not data processing according to said third command is to be executed.

7. A device according to claim 1, further comprising:
   third receiving means for receiving said third command and said area definition information.

8. A device according to claim 7, further comprising means for checking if said area definition information is stored in said user area.

9. A device according to claim 8, further comprising means for determining, in accordance with said checking means, whether or not said comparing means can execute the comparison.

10. A device according to claim 1, further comprising:
    means for verifying optional data written in said user area;
    means for permitting creation of a write area in said user area only after said user area is filled with predetermined identical data; and
    means for disabling said verifying means after said write area is created.

* * * * *